United States Patent [19]

Streel

[11] 3,779,802

[45] Dec. 18, 1973

[54] PROCESS FOR THE MANUFACTURE OF A WELDING WIRE, AND WELDING WIRE

[75] Inventor: Dominique Thomas Francois Streel, Ougree, Belgium

[73] Assignee: Cockerill-Ougree-Providence et Esperance-Longdoz en abrege "Cockerill", Seraing-lez-Liege, Belgium

[22] Filed: June 17, 1971

[21] Appl. No.: 153,952

[30] Foreign Application Priority Data

June 24, 1970  Belgium ............................. 42,869

[52] U.S. Cl............ 117/207, 117/107 R, 117/107.1, 117/107.2
[51] Int. Cl......................... B23k 35/00, C23g 1/00
[58] Field of Search.............. 117/206, 207, 106 A, 117/107, 107.1, 107.2

[56] References Cited
UNITED STATES PATENTS

| | | |
|---|---|---|
| 1,754,566 | 4/1930 | Miller ................................ 117/207 |
| 3,637,421 | 1/1972 | Gimigliaro ......................... 117/107 |
| 3,029,506 | 4/1962 | Griffiths............................. 117/207 |
| 3,102,827 | 9/1963 | Kriewall............................. 117/207 |
| 3,421,952 | 1/1969 | Conrad et al.................. 117/106 A |
| 3,438,802 | 4/1969 | Kanter............................ 117/106 A |
| 3,502,450 | 3/1970 | McCoy ............................... 117/207 |
| 3,574,678 | 4/1971 | Stark.................................. 117/207 |
| 2,067,630 | 1/1937 | Franks ............................... 117/207 |

Primary Examiner—Alfred L. Leavitt
Assistant Examiner—M. F. Esposito
Attorney—Young and Thompson

[57] ABSTRACT

A process for the manufacture of a welding wire having a core of base welding steel provided with a covering of an additional element, which comprises depositing a coating of said additional element directly onto the core of base welding steel. Preferably the additional element is deposited by the method of evaporation under vacuum.

4 Claims, No Drawings

PROCESS FOR THE MANUFACTURE OF A WELDING WIRE, AND WELDING WIRE

BACKGROUND OF THE INVENTION

This invention relates to a process for the manufacture of a welding wire in which a core of welding steel is provided with a covering of an additional element.

It is known that for effecting electric arc welding with gas or flux, steel rods or wires of variable chemical composition are used depending on the nature of the work to be done and the welding conditions.

While for the purpose of welding ordinary steels, one may use welding rods having a composition close to that of these steels, having however a low manganese content variable from 0.3 percent to 0.9 percent, welding of special steel and, more particularly, stainless steels, necessitates welding rods with a much greater manganese content. In this instance, the necessary manganese content may vary from 2 to 3 percent.

Moreover, when wearing members are to be strengthened, one uses welding rods with a high content of manganese.

It is also known that the welding rods used at present sometimes have on their steel core a chemical coating or covering maintained by means of a cement. In addition, it is also known to constitute the covering by an additional metal cemented on the core of base welding steel and whose function is to increase the concentration of one of the components of said base welding steel.

On the other hand, for welding with gas or flux, one uses bare or uncovered wires which generally are relatively thin with a high manganese content and which sometimes are cut into rods.

Base welding steels with high manganese content, as used for making rods and wires for welding purposes are comparatively difficult to manufacture. In addition, these steels have special mechanical properties such as a high hardness so that milling and extruding of these steels are difficult to effect.

For the above reasons, welding rods and wires with high contents of manganese are costly which is a disadvantage. The latter is further increased by the fact that an increasing number of kinds of rods and wires are to be manufactured so as to correspond with different contents of manganese for the purpose of meeting the needs resulting from more and more diversified conditions of welding. The result thereof is that the number of rods or wires to be made of a given composition is never very high, which causes difficulties of supply of base welding steel.

SUMMARY OF THE INVENTION

The problem to be solved by the present invention is to obtain a welding wire whose content of one of the components of the base welding steel may systematically be increased with a very high precision and according to varying degrees depending on the intended use.

A solution of said problem is provided according to the invention by a manufacturing process of a welding wire which comprises depositing directly onto the base welding steel wire taken as a support, a coating of an additional element whose proportion is to be increased with respect to that of the base welding steel wire, which results in a welding wire composed of a supporting core of base welding steel covered or coated with an additional element.

DETAILED DESCRIPTION OF THE INVENTION

According to a particular feature, the additional element is deposited onto the base welding steel supporting core by the method of evaporation under vacuum. The use of said method is particularly advantageous due to the great variety of composition which it permits one to obtain easily and systematically with an extreme precision.

According to another feature, the additional element composing the coating deposited on the base welding steel supporting wire by the method of evaporation under vacuum may be a pure metal such as manganese, an alloy or silicon.

The present invention is simple to apply : the process essentially consists in coating a welding steel supporting wire with a layer of additional element on its entire lateral surface and with a thickness such that after melting of the base welding steel supporting wire and said coating, there is formed a welding steel having the desired high content of said additional or filler element in the weld.

Thus, if it is desired to obtain a welding wire with a high content of manganese, one deposits by evaporation under vacuum, onto a common welding wire, manganese so as to form such a layer that, upon melting, there is formed a steel with the desired high content of manganese.

Because an apparatus for depositing a metal coating onto metal wire by evaporation under vacuum is already known, such apparatus will not be described in detail in this specification.

Let it only be recalled that said advantageous apparatus comprises an enclosure in which there is a vacuum of about $10^{-4}$ Torr, said enclosure being traversed by the wire to be coated which passes along the axis of a ring-shaped melting-pot surmounted with a cone of tantalum whose inner surface heated to a temperature of about 1,000°C reflects the atoms of metal emitted from the melting-pot, the surface of which is bombarded by an electronic gun. When the melting-pot contains manganese which is a metal with high vapour pressure, it is impossible to cause the manganese to melt because it sublimates as soon as its temperature reaches 1,500°C and its vapour pressure is $10^{-1}$ Torr. This is perfectly suitable for the deposition operation.

The weight of deposited manganese, which is of course variable depending on the average content of manganese to be obtained in the weld, is distributed as a layer whose thickness can be calculated from the following simplified formula:

$$PMn/Pa = 2e/R \cdot dMn/da$$

in which
 PMn is the weight of manganese
 Pa is the weight of steel
 e is the thickness of the layer, in mm
 R is the radius of the wire, in mm
 dMn is the specific gravity of manganese
 da is the specific gravity of steel.

By applying the above formula, it is found that deposition of 1.5 gr manganese onto ordinary steel welding wire of 3 mm diameter and 1 m length and containing about 0.4 percent of Mn, gives a coating formed by a layer of manganese with a thickness of 22 microns, which gives then by melting a steel having an average content of manganese of about 3 percent.

The present process makes it possible even to deposit elements other than manganese, e.g., silicon, vanadium, copper and alloys.

It is possible to obtain welding wires having as various contents as desired for a given metal, starting from a supporting wire having a single given composition, which is most inexpensive. In addition, the various contents may be obtained very precisely. One obtains thus entirely new welding alloys by applying a simple and easy method.

The welding wire may be subjected to subsequent operations such as coating, winding or cutting according to its intended uses.

What I claim is :

1. A process for the manufacture of a welding wire of a required high composition in manganese, comprising forming a steel wire core having a low content in manganese not more than about 0.9 percent by weight so as to enable the fabrication of the wire without breaking, and depositing on said wire core a coating consisting essentially of manganese by evaporation under vacuum to obtain a steel cored welding wire, the thickness of said coating being such as to raise said low content in manganese to a manganese content of about 2 to 3 percent by weight.

2. A process according to claim 1, in which said manganese has a thickness of about 22 microns.

3. A welding wire consisting essentially of a core of base welding steel having a low content in manganese not more than about 0.9 percent by weight so as to enable the fabrication of the wire without breaking, and a coating deposited on said wire core by evaporation under vacuum and consisting essentially of manganese, the thickness of said coating being such as to raise said low content in manganese to a manganese content of about 2 to 3 percent by weight.

4. A welding wire according to claim 3, in which said manganese has a thickness of about 22 microns.

* * * * *